United States Patent
Sacca

(10) Patent No.: US 7,174,772 B2
(45) Date of Patent: Feb. 13, 2007

(54) SYSTEM AND METHOD FOR LEAK DETECTION

(76) Inventor: Giuseppe Sacca, 24241 Tama La., Laguna Niguel, CA (US) 92677

( * ) Notice: Subject to any disclaimer, the term of this patent is extended or adjusted under 35 U.S.C. 154(b) by 1 day.

(21) Appl. No.: 11/057,724

(22) Filed: Feb. 12, 2005

(65) Prior Publication Data
US 2006/0179922 A1 Aug. 17, 2006

(51) Int. Cl.
*G01M 3/04* (2006.01)
(52) U.S. Cl. .................................. 73/49.2
(58) Field of Classification Search ............ 73/40, 73/49.2, 49.3, 49.8
See application file for complete search history.

(56) References Cited

U.S. PATENT DOCUMENTS

| | | | | |
|---|---|---|---|---|
| 3,315,519 | A | * | 4/1967 | Ferguson .................. 73/40 |
| 3,603,138 | A | * | 9/1971 | Peterson ................... 73/37 |
| 3,991,604 | A | * | 11/1976 | Hayes et al. .............. 73/37 |
| 4,010,588 | A | | 3/1977 | Eisert |
| 4,089,571 | A | | 5/1978 | Landy |
| 4,141,609 | A | | 2/1979 | Eisert |
| 4,206,631 | A | | 6/1980 | Nysse et al. .............. 73/40 |
| 4,776,209 | A | | 10/1988 | Patchel .................... 73/45.5 |
| 4,942,758 | A | | 7/1990 | Cofield |
| 5,065,350 | A | | 11/1991 | Fedder |
| 5,287,729 | A | | 2/1994 | Lehmann |
| 5,412,978 | A | | 5/1995 | Boone et al. |
| 5,546,789 | A | | 8/1996 | Balke et al. .............. 73/40 |
| 5,578,747 | A | | 11/1996 | Nottingham et al. |
| 5,600,996 | A | | 2/1997 | Witschi |
| 6,202,476 | B1 | | 3/2001 | Fenlon |
| 6,354,142 | B1 | | 3/2002 | Nothhelfer et al. |
| 6,584,828 | B2 | | 7/2003 | Sagi et al. |
| 6,662,634 | B2 | | 12/2003 | Lehmann |

(Continued)

FOREIGN PATENT DOCUMENTS

JP 56-140232 11/1981

(Continued)

OTHER PUBLICATIONS

Skan AG, Skan Glove and Isolator Test Unit, Typ HSPG-3, IT/HSPG/03.04 (2 pages).

*Primary Examiner*—Daniel S. Larkin
(74) *Attorney, Agent, or Firm*—Lawrence N. Ginsberg

(57) ABSTRACT

A leak testing control assembly for a leak testing system of a type that cooperates with a test part interface that is coupled with a test part. In a broad aspect the leak testing control assembly includes a working fluid generator for applying a working fluid having a fluidic pressure to a test part. A flow controller assembly is coupled to the working fluid generator. The flow controller assembly includes a flow controller element for controlling the flow rate of the working fluid. A pressure level measuring element is positioned relative to the test part for measuring the fluidic pressure. A control system is coupled to the flow controller assembly and the pressure level measuring element. A user interface is coupled to the control system for providing user interaction with the leak testing control assembly. During operation, the control system 1) facilitates application of the fluidic pressure at a selected relatively constant flow rate; and, 2) interprets the value of the fluidic pressure, after the application of the fluidic pressure at the selected relatively constant flow rate, to determine whether the test part is free of leaks.

17 Claims, 10 Drawing Sheets

U.S. PATENT DOCUMENTS

2004/0149014 A1   8/2004   Castro et al.

FOREIGN PATENT DOCUMENTS

| JP | 04-151849 | 5/1992 |
| JP | 05-010843 | 1/1993 |
| JP | 06-075092 | 3/1994 |
| JP | 07-128179 | 5/1995 |
| JP | 07-218377 | 8/1995 |
| JP | 09-079810 | 3/1997 |
| JP | 2002-131171 | 5/2002 |
| JP | 2002-280277 | 9/2002 |

* cited by examiner

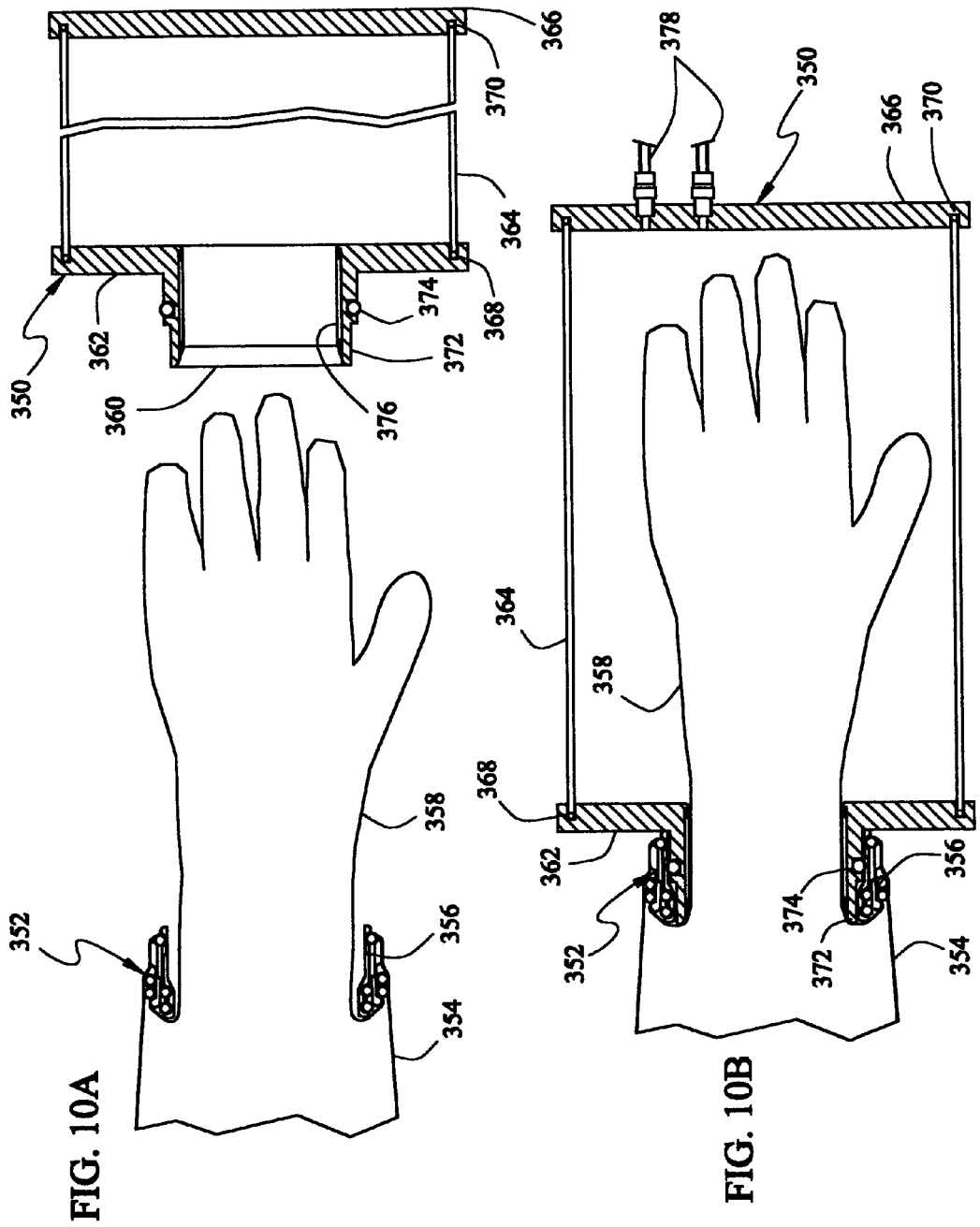

SYSTEM AND METHOD FOR LEAK DETECTION

BACKGROUND OF THE INVENTION

1. Field of the Invention

This invention relates to leak detection systems and more particularly to leak detection systems for gloves utilized with isolator barrier systems.

2. Description of the Related Art

Certain manufacturing processes require the maintenance of separation between two environments to avoid contamination of the cleaner of the two environments by the dirtier of the two. This is accomplished with the use of environments, such as isolation barriers also commonly known as gloveboxes or simply isolators. For example, in the case of certain pharmaceutical products, the manufacturing process is perfomied within these isolation barriers to prevent contamination of the product being produced by dust particles, bacteria and viruses that are found in the outside ambient air. This type of application is commonly referred to as an aseptic application of isolation barriers. The same holds true for the assembly of certain medical devices. In the case of radioactive operations or bacteriological procedures, the environment within the isolation barrier is dirty as compared to the outside ambient air. In these cases, the isolation barrier serves the function of keeping the product being handled from escaping into the external environment and they are commonly referred to as containment applications of isolation barriers.

In recent years, in the pharmaceutical industry, because of the expense and operational difficulties of maintaining so-called "clean rooms" into which operators enter to carry out procedures, the use of isolation barriers has become common practice. The isolation barriers, in concept large glove boxes, are integrated onto the machinery used to carry out the necessary manufacturing operations. A variation of these isolation barriers is what is commonly known as a RABS, Restricted Access Barrier System.

To facilitate viewing of the interior of such isolation barriers by technicians, its walls are commonly fabricated of transparent materials, such as glass or polycarbonate sheet. If an opaque material is used, for example stainless steel, appropriate viewing windows are provided. The walls of the barrier isolators are commonly fitted with a plurality of ports in which a glove is secured such that a technician may insert his hands into the port and perform manipulative operations within the enclosure.

Two types of glove devices are currently used in the industry. A first type, commonly known as a one-piece gauntlet, is a single piece device that includes a glove end fitting the user's hand, a sleeve portion that covers the arm of the user and a port interface portion that connects directly to the port itself. The gauntlet is fabricated of homogeneous rubber material that provides the imperviousness while permitting the necessary level of dexterity to the operator.

A second type of glove device is a two-piece glove/sleeve assembly. This device consists of a glove end that covers only the hand of the operator. It is fabricated of homogeneous rubber material and provides the necessary level of dexterity to the operator. The glove is attached to a plastic cuff by means of a clamping devices such as a rubber "O" ring. The cuff is then attached, also In sealing fashion, to a sleeve attached to the barrier isolator wall. The sleeve is fabricated of somewhat tougher material than the glove with a resulting better resistance to damage.

Both the one-piece gauntlet and the two piece glove/sleeve assembly permit the access of the operator into the internal volume of the barrier isolator to the point that the operator's shoulder fits within the opening of the port itself.

Examples of glove and port types are those disclosed in U.S. Pat. No. 4,010,588, U.S. Pat. No. 4,089,571, U.S. Pat. No. 4,141,609 and U.S. Pat. No. 5,578,747.

The operative manipulations that the operator typically conducts using the gloves of the barrier isolator involve the handling of components that can cause damage to the glove itself. Such damage may range from an obvious visible tear—to a miniscule, invisible to the naked eye, pinhole. A glove integrity breach is a major concern for both applications of barrier isolators. In the case of an aseptic operation, the operator's hand that is by definition "dirty" can come into contact with the breach thus creating the possibility of contaminating the product within the barrier isolator chamber. In the case of containment applications, the breach can allow the compound being contained within the barrier isolator to escape with a resulting hazardous exposure to the operator.

The above clearly explains the need for a means of detecting such integrity breaches in the gloves and sleeves of barrier isolators, in particular those breaches that are not clearly visible to the operator. One can also appreciate the need for being able to test the integrity of such glove devices in-situ, meaning while they are installed onto the barrier isolator, and the barrier isolator is in operation (meaning that it is either sterile or contains a dangerous compound).

Numerous technologies have been developed for the purpose of detecting pinholes in rubber gloves. Japanese Patent JP04151849 discloses a system in which the glove under test is filled with water and placed under vacuum. Water detection outside the glove is indicative of a breach. Another technology is disclosed in Japanese patent JP07128179 in which hot gas is blown into the glove and a temperature gradient on the outer surface of the glove under test is an indication of a defect. Another technology is disclosed in Japanese patent JP07218377 in which ultrasonic waves are used to detect the presence of a breach. Japanese patent number JP56140232 discloses a system in which light detection within the glove is used for the same purpose. Also, in Japanese patent JP09079810, a breakdown of the dielectric properties of the material at the location of the breach is used for the detection.

Another technology that evaluates the integrity of containers that are flexible in nature is that disclosed in U.S. Pat. No. 5,287,729 and U.S. Pat. No. 6,202,476. This technology makes use of the physical deformation of the flexible portion of the container under test to make a determination as to its integrity. Such technology would encounter difficulties in its adoption for testing gloves because of the rubber material of the glove and the inherent unpredictable physical behavior of the material itself. U.S. Pat. No. 5,600,996 discloses an additional technology that is not conducive to leak testing of a rubber glove because it relies on the volumetric behavior of the test part when compared to a standard part of identical volume. The rubber material of the glove does not permit the use of physical characteristics to determine test part integrity.

Bubble leak detection is a commonly used technology for leak testing of rubber gloves. This technology is disclosed in Japanese patent number JP05010843. This technology uses the visual detection of air bubbles escaping through breaches in the glove while the glove is submerged in fluid and pressurized to a given pressure level. A variation of this technology is that disclosed in U.S. Pat. No. 4,776,209 in which the glove is not submerged in fluid but, nevertheless, bubbles are visually detected in the apparatus when a breach is present in the glove under test. Although reliable and widely used, this technology has the inherent limitation that the detection of a breach is ultimately left up to the visual observation by the operator, with the related human factor reliability limitations. In addition, the use of a fluid in a production environment can be operationally limiting and unfriendly.

Tracer gas technology is widely used for container leak testing purposes in many industries. The technology is based on the principle that, if a breach exists in a part, the test gas of choice, for example helium, nitrogen or oxygen, will pass through the breach and will be detected by an appropriate sensor. An example of this technology is that disclosed in U.S. Pat. No. 6,354,142. In this patent, the tracer gas is contained within the container under test. Its detection is indicative of a leak if the container is placed under appropriate pressure within a sealed chamber. Although extremely sensitive and therefore susceptible to "false" positives due to the nature of the test approach itself, tracer gas technology can be adapted to rubber glove leak testing purposes as demonstrated in U.S. Pat. No. 5,578,747. This patent applies directly to the field of the current invention and uses oxygen detection within a chamber that is evacuated with nitrogen prior to the testing of the glove. A different example of the use of this technology for the purpose of detecting breaches in gloves is that disclosed in the International Publication WO 00/27478. This patent demonstrates how a breach in the glove can be found by detecting the presence of oxygen within a gap between an inner and outer layer of the glove after this gap is purged of oxygen with an inert gas, such as nitrogen.

Another technology that is adopted for leak testing of gloves is that of leak rate detection. This technology is based on the inflation of the test part to a given pressure value and measuring the gas flow rate required to maintain such pressure level. If this measured flow rate is higher than some predetermined value, the part under test is deemed to be defective. U.S. Pat. No. 4,942,758 is an example of a high speed, automatic application of this technology. The part is placed under pressure and the flow rate required to apply this pressure is compared to a threshold. The same technology, but different means of applying it, is that disclosed in U.S. Pat. No. 5,546,789. The '789 device uses a bell jar enclosing of the test part that is pressurized to a given value so that, if leaking, it causes an airflow into the bell jar that is detected by an appropriate flow meter and includes an offset flow rate to compensate for possible leaks of the test apparatus itself. U.S. Pat. No. 6,584,828 describes an additional use of this technology where the unit under test is placed under pressure and is determined to be leaking if the air flow entering the chamber is measured to be above a certain threshold value. The three US patents listed above describe in detail the extensive use of modern sensor technology, calculating systems, electronics and software that permit the implementation of the technology in a production environment by providing the appropriate feedback of the test's outcome to the operator. The leak rate detection method for detecting leaks in a test item works very well in those applications where the item under test is rigid in its physical construction therefore occupying a consistent, fixed volume. It is much more difficult to apply this technology to the testing of rubber components, such as barrier isolator gloves. The stretching and eventual creep that goes on in a rubber device once positive or negative pressure is applied to its surfaces make achieving a precise reference pressure very time consuming. Time management is an important factor in any manufacturing operation. Nevertheless, Japanese Patent 2002-280277 demonstrates the application of this technology to negative pressure testing of the barrier isolator glove. The glove under test is placed inside a vacuum chamber while it is still attached to the isolator wall. It is placed under negative pressure of a given value and the flow rate is compared to an acceptability threshold.

The Swiss company SKAN AG produces a glove leak tester that adopts the leak rate monitoring technology to determine whether the glove under test is to be rejected. The glove under test is pressurized to a given reference pressure by using the air enclosed in a pressure chamber. Flow will occur between the pressure chamber and the glove under test until equilibrium is reached. This equilibrium will not be reached if a breach is present in the glove under test. The Skan system incorporates a number of control system features that aid the operational aspects of the device in the manufacturing environment.

Another technology that is widely used to test the integrity of containers is that of pressure decay. The internal volume of the part under test is pressurized to a threshold value and then sealed off. The amount of pressure decay over a set time duration is indicative of whether the part is leak tight. Pressure decay testing of the integrity of a test container is well demonstrated in U.S. Pat. No. 6,662,634. In the system disclosed in that patent, a pressure profile graph of the test cycle is provided to clearly show the behavior of the pressure as it drops over time after the inflation air supply is shut off. The part under test is placed under positive or negative pressure and the pressure value at the end of the test is electronically compared to a stored pass/fail value to determine the test outcome. Air temperature changes during the pressure decay cycle have an impact on the accuracy of the test results. As air is compressed to pressurize the part under test, its temperature rises. As the pressure drops as result of the test, the air temperature drops as well. This causes an error in the pressure value that is not related to the leak testing process. U.S. Pat. No. 5,065,350 adds temperature compensation to the pressure decay process to address the impact of air temperature fluctuations during the test by adding a compensating factor to the pressure values obtained during the test.

Pressure decay technology has been adopted for glove integrity testing. U.S. Pat. No. 4,206,631 applies to the field of surgical glove testing and addresses the expandable nature of the rubber glove by restraining the part under test in a clam shell of appropriate geometric configuration and inflating the part under test to values beyond the point of rupture to address the effect of stress relaxation and creep that is inherent to stretching of rubber like components. Another example of pressure decay testing of a rubber glove is that shown in the Japanese patent number 2002-131171 in which a method for attaching and sealing to the part under test is demonstrated. Japanese patent 06-75092 demonstrates a similar pressure decay application except that the part under test is placed is placed under vacuum rather than positive pressure. U.S. application Ser. No. 2004/0149014A1 demonstrates the application of pressure decay technology to integrity testing of gloves of a barrier isolator. This patent publication describes, in detail, the means for in-situ sealing the part under test from the surrounding environment for the purpose of conducting the test. The test method is defined as simple monitoring of the glove internal pressure by means of a pressure gage to detect the pressure drop that is indicative of a leak.

U.S. Pat. No. 5,412,978 discusses integrity testing of a test part using either a leak flow rate detection or pressure decay detection but it also provides means for accelerating the leak test process by separating the process in three distinct phases and forcing the transfer from one phase to the next by detecting flow rate into the test part rather that a fixed time duration. The '978 patent stresses the need to be able to perform the leak test in as short a time as possible because of manufacturing efficiency reasons.

Accordingly, there is a need for a glove leakage detection method and apparatus that can deal with the stress relaxation and creep characteristic of rubber gloves, operates in a static or equilibrium mode rather than dynamic mode and permits trending of the test values to shorten leak test times.

SUMMARY

The present invention is a leak testing control assembly for a leak testing system of a type that cooperates with a test part interface that is coupled with a test part. In a broad aspect the leak testing control assembly includes a working fluid generator for applying a working fluid having a fluidic pressure to a test part. A flow controller assembly is coupled to the working fluid generator. The flow controller assembly includes a flow controller element for controlling the flow rate of the working fluid. A pressure level measuring element is positioned relative to the test part for measuring the fluidic pressure. A control system is coupled to the flow controller assembly and the pressure level measuring element. A user interface is coupled to the control system for providing user interaction with the leak testing control assembly. During operation, the control system 1) facilitates application of the fluidic pressure at a selected relatively constant flow rate; and, 2) interprets the value of the fluidic pressure, after the application of the fluidic pressure at the selected relatively constant flow rate, to determine whether the test part is free of leaks. This methodology is particularly advantageous in the testing of rubber-like components, such as gloves, because it involves creating a condition of equilibrium of the flow and pressure thus nullifying the effect of stretch relaxation and creep of the material itself. The invention is particularly applicable with respect to its utilization with leak detection systems for gloves utilized with isolator barrier systems. However, it can be adopted with numerous other applications, such as leak testing of surgical gloves or prophylactic condoms, during the manufacturing process. In general, the invention is conducive to the leak testing process of any rubber-like components that have the requirement to be leak free and are susceptible to damage during either the manufacturing processes or during use.

In a more narrow aspect, the flow controller assembly further includes a high flow valve for applying an initial fluidic pressure to tiie test part at a higher flow rate than the selected relatively constant flow rate prior to the application of a fluldic pressure to the test part at the selected flow rate. The control system adjusts the relatively higher flow rate for a first programmed time duration to maintain the fluidic pressure to the test part at or above a predetermined threshold pressure also prior to the step of applying a fluidic pressure to the test part at the selected relatively constant flow rate. Further, the control system applies the selected relatively constant flow rate for a second programmed time duration before comparing the fluidic pressure with the predetermined threshold pressure wherein the fluidic pressure being greater than the predetermined threshold pressure is indicative of a leak free test part and wherein the fluidic pressure being lower than the threshold pressure is indicative of a leak in the test part. This methodology of using the predetermined threshold pressure as the indicator of a passing or a failing leak test has the advantage of subjecting the test part to a given test pressure level while injecting a constant flow rate. As a result, it is possible to approximate a stable and repeatable test part condition, meaning consistent amount of stretch, at the time that the pass/fail determination is made. This is particularly of importance when testing a rubber-like component, such as a rubber glove.

In an alternate embodiment, the flow controller assembly includes a high flow valve as discussed above; however, the system utilizes a positive pressure trend with the fluidic pressure being greater than the predetermined threshold pressure as indicative of a leak free test part and a negative pressure trend with the fluidic pressure being lower than the predetermined threshold pressure as indicative of a leak in the test part. This method of interpreting the leak test conditions adds the benefit of minimizing the leak test cycle duration by allowing its determination to be based on conditions rather than time duration.

Other objects, advantages, and novel features will become apparent from the following detailed description of the invention when considered in conjunction with the accompanying drawings.

BRIEF DESCRIPTION OF THE DRAWINGS

FIG. 10 is a negative pressure cuff interface that shows a possible interface to an isolator glove featuring a cuff type of glove mounting.

DETAILED DESCRIPTION OF THE INVENTION

Figure 1:
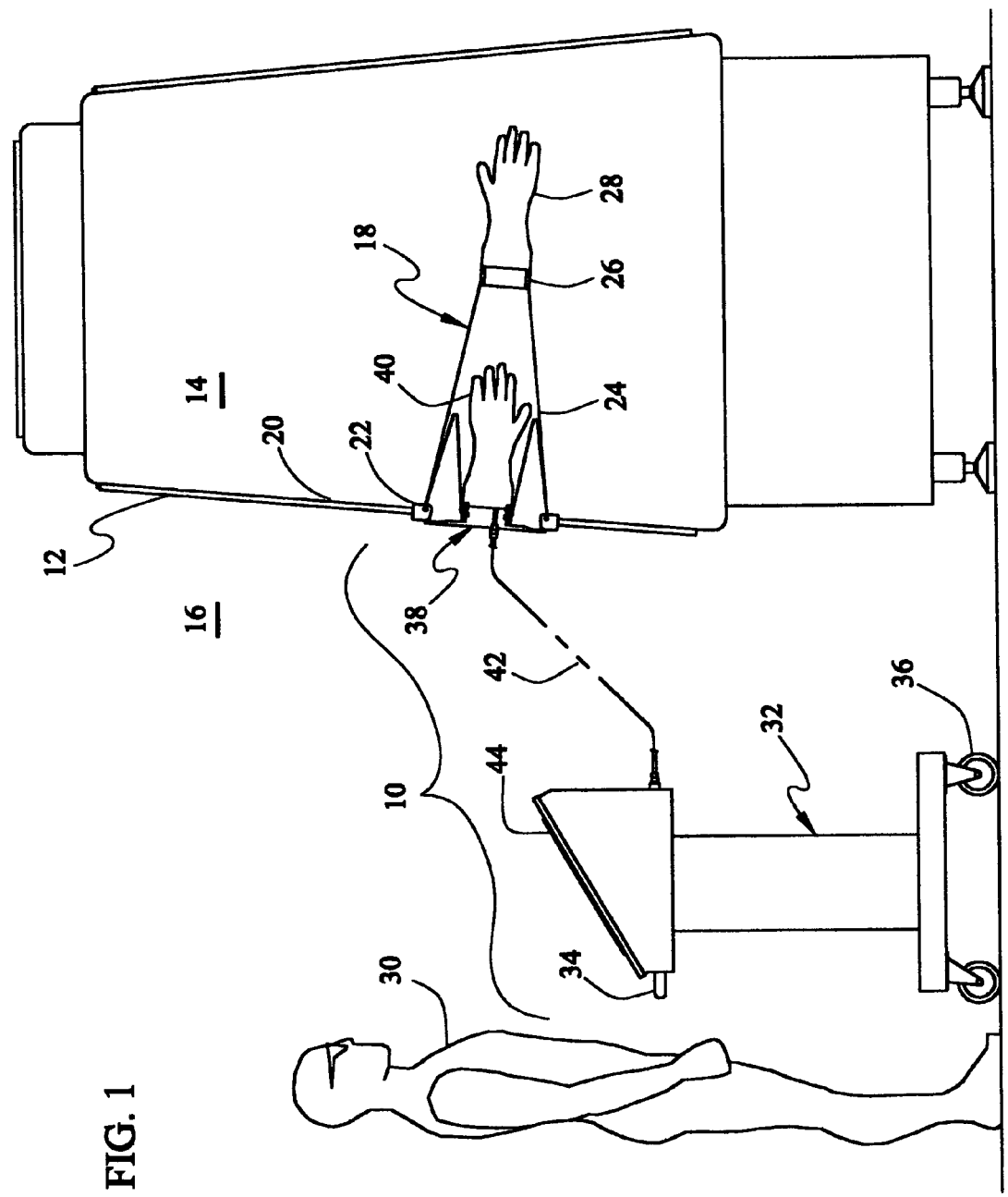
FIG. 1 is an overall view of the leak testing system of the present invention and its environment while in use. Shown are the control console, the negative pressure vacuum chamber, the barrier isolator system and the glove under test.

Referring to the drawings and the characters of reference marked thereon, FIG. 1 illustrates a preferred embodiment of the leak testing system of the present invention, designated generally as 10, shown in use in a normal positive pressure operating environment. The operating environment includes a barrier isolator 12 that creates a sterile environment 14 within a non-sterile filling room 16. To permit access to the sterile environment 14 of the barrier isolator 12, a gloveport system 18 is attached in sealing fashion to the barrier isolator wall 20 of barrier isolator 12. In this particular embodiment, gloveport system 18 includes a gloveport 22, sleeve 24, cuff 26 and glove 28. During normal use, the gloveport system 18 is oriented to the inside of the barrier isolator 12 within the sterile environment 14.

The leak testing system 10 includes a leak testing control assembly, designated generally as 32; and, a test part interface, designated generally as 38. During use, as will be discussed in more detail below, the operator 30 maneuvers the leak testing control assembly 32 inside the non-sterile filling room 16 using handle 34 and facilitated by casters 36. The operator 30 places test part interface 38 onto gloveport 22 and installs test part 40 onto test part interface 38. Operator 30 then completes a pneumatic connection 42 between leak testing control assembly 32 and test part interface 38 and performs a leak test of test part 40. Operator 30 conducts the leak test cycle using control panel 44 of leak testing control assembly 32.

Figure 2:
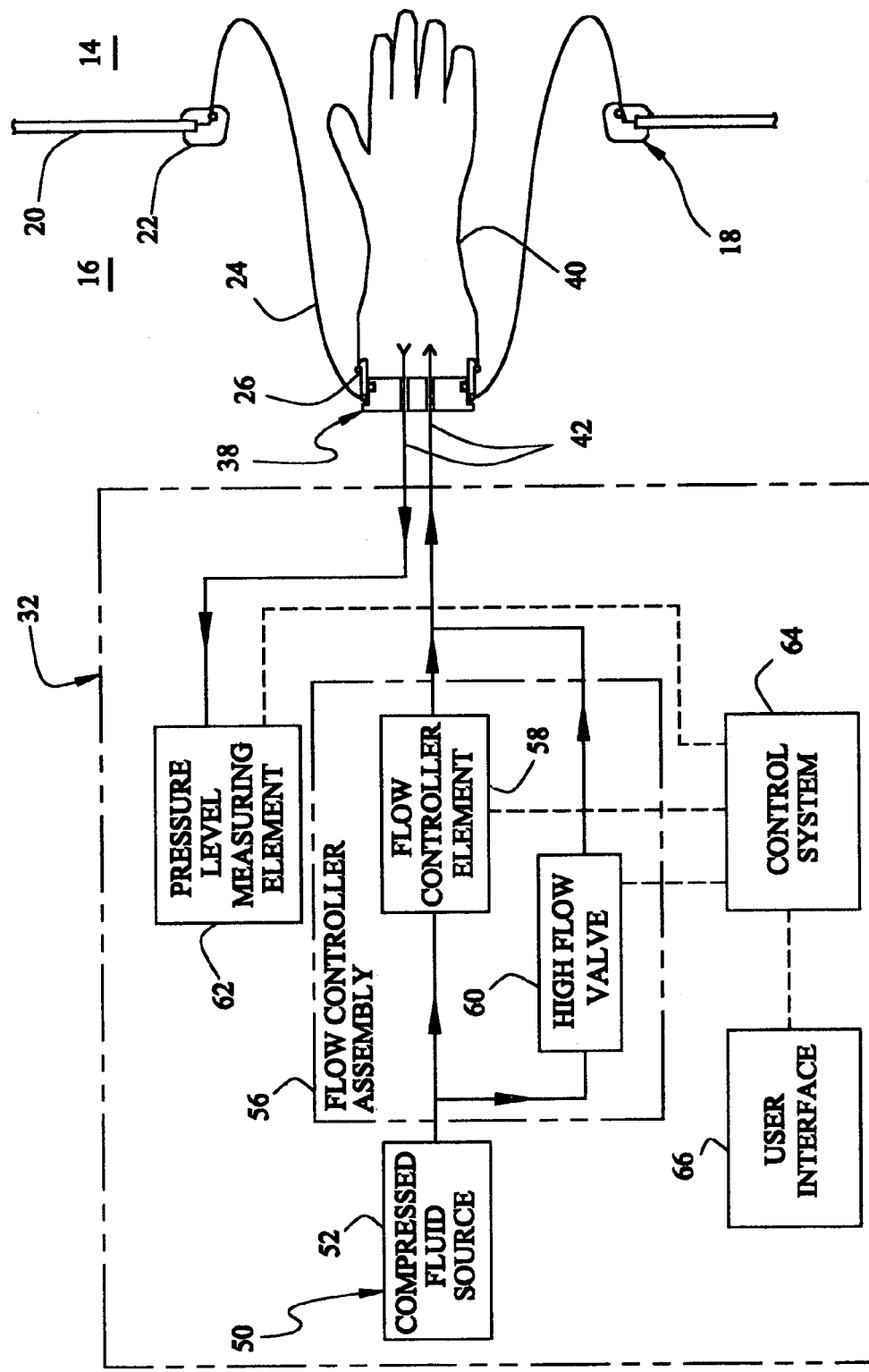
FIG. 2 is a schematic representation of the leak testing system including a functional block diagram of the system in its positive pressure usage configuration.

Referring now to FIG. 2, the functional components of the leak testing control assembly 32 are shown when operating in the positive pressure leak test mode. The leak testing control assembly 32 includes a working fluid generator, designated generally as 50, for applying a working fluid having a fluidic pressure to test part 40. The working fluid generator 50 may be a compressed fluid source 52, as shown in this positive pressure environment, or as will be discussed below, a vacuum source in a negative pressure environment. In the positive pressure example, the compressed fluid source 52 pressurizes the test part 40 by introducing the working fluid at a selected relatively constant flow rate into an interior volume of the test part. The compressed fluid source 52 may be, for example, a diaphragm type compressor connected to the system via a suitable coalescing filter and an adjustable pressure regulator set at, for example, about 3 to 5 psi pressure. Obviously, other suitable fluid sources may be used, such as a commercially available pressurized tank or facility compressed air supplied by the user of the leak tester.

A flow controller assembly 56 is coupled to the working fluid generator 50. The flow controller assembly 56 includes a flow controller element 58 for controlling the flow rate of the working fluid. It also preferably includes a high flow valve 60 for applying an initial fluidic pressure to the test part 40 at a higher flow rate than the selected relatively constant flow rate prior to the application of the fluidic pressure to the test part at the selected flow rate. Flow controller element 58 may be, for example, a mass flow type of flow controller capable of measuring flow rates as low as 100 Standard Cubic Centimeter per Minute and capable of electronically communicating the flow rate value to other electronic devices. It also may include the capability of achieving the desired flow rate according to a programmable flow rate value via electronic communication to other electronic devices.

A pressure level measuring element 62 is coupled to the interior volume of test part 40 via pneumatic connections 42 and measures the fluidic pressure of the interior volume of test part 40. Pressure level measuring element 62 may be, for example, a pressure transducer capable of measuring pressure values as high as 4000 pascals and capable of electronically communicating the pressure value to other electronic devices.

A control system 64 is coupled to flow controller assembly 56 and pressure level measuring element 62. As will be discussed in more detail below, control system 64 facilitates application of fluidic pressure at a selected relatively constant flow rate to test part 40, and interprets the value of the resulting fluidic pressure to determine whether the test part is free of leaks. Two methods of interpreting the resulting fluidic pressure value will be described in detail below. Control system 64 may be, for example, a commercially available Programmable Logic Controller (PLC) connected to a number of discrete devices, as will be discussed in detail below.

A user interface 66 is coupled to control system 64 for providing user interaction with the testing control assembly 32. User interface 66 may include, for example, a number of discrete devices mounted on an appropriate display device, such as control panel 44. Alternate user interface possibilities are also possible, as will be discussed in greater detail below.

The flow controller assembly 56 and pressure level measuring element 62 are connected to test part 40 via pneumatic connection 42 and test part interface 38. In the example given, test part 40 is part of the gloveport system 18 that is attached to the barrier isolator wall 20 via cuff 26, sleeve 24 and the gloveport 22.

Figure 3:
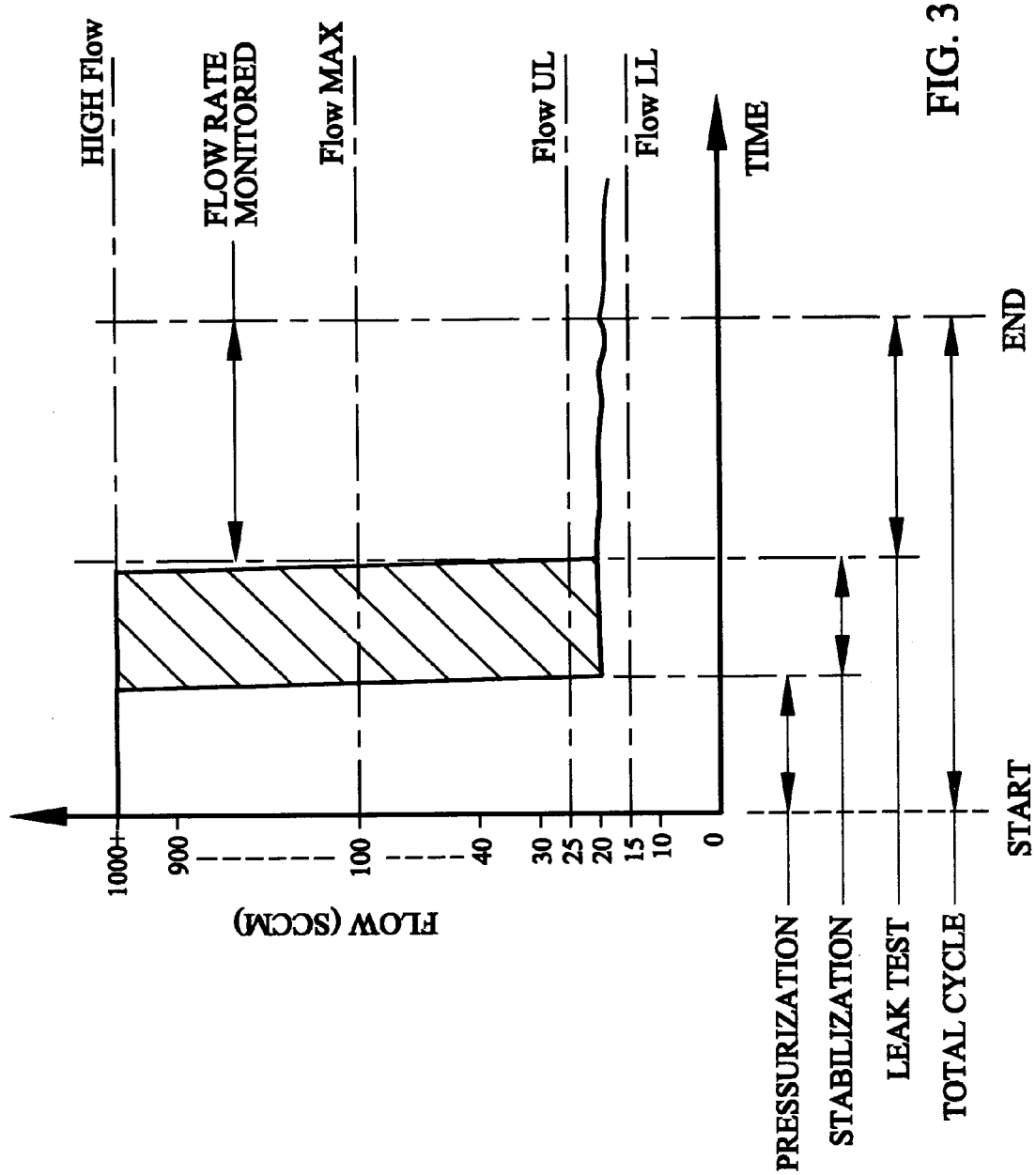
FIG. 3 is an airflow profile diagram that shows the airflow profile throughout the leak test cycle.
Figure 4:
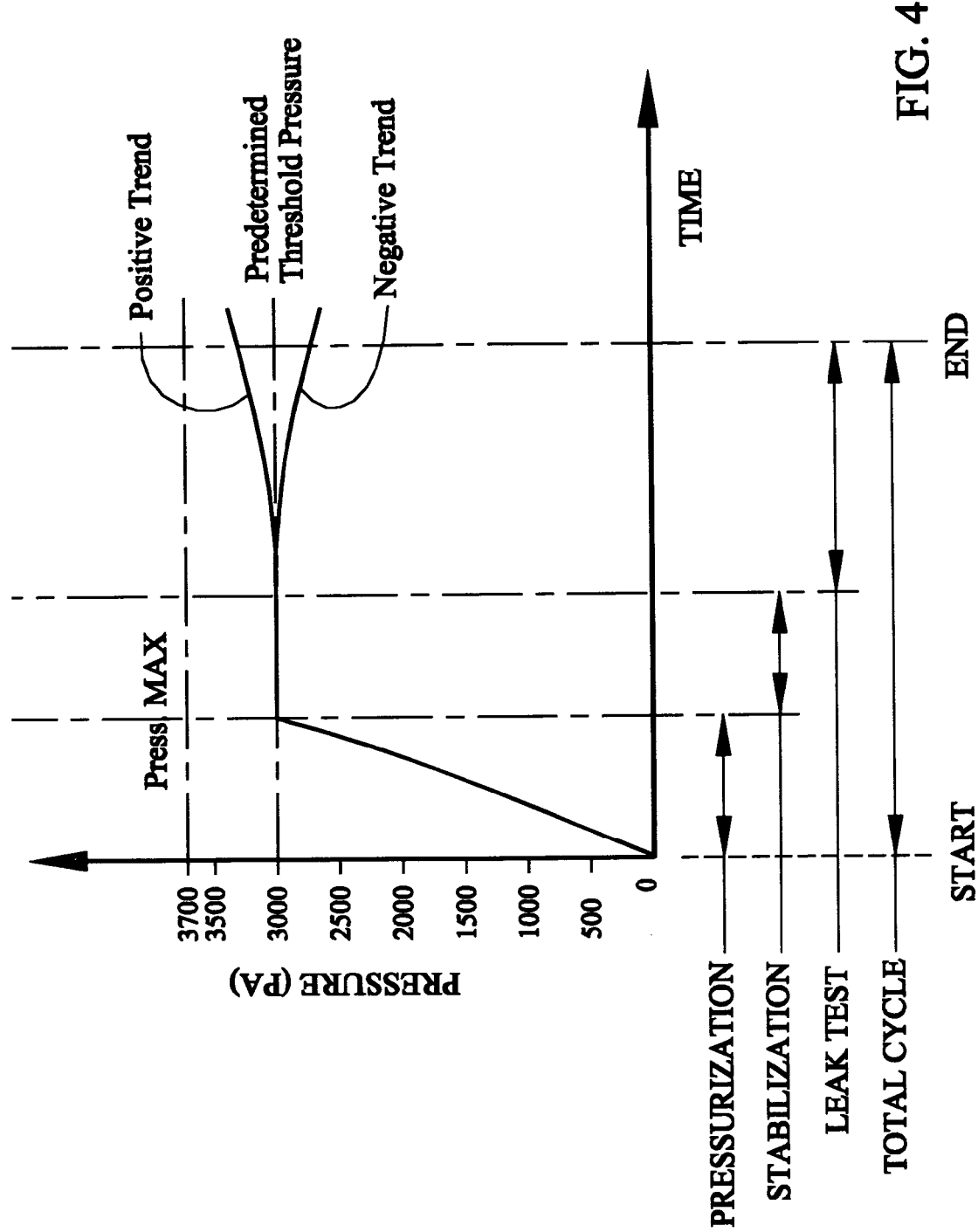
FIG. 4 is a pressure profile diagram that shows the values of the pressure with the glove under test throughout the leak test cycle.

Referring now to FIGS. 2, 3 and 4, the principle of the leak test process is demonstrated. In summary, the leak test cycle consists of three separate phases, the Pressurization phase, the Stabilization phase and the Leak Test phase.

During the pressurization portion of the cycle, the pressure within the test part 40 is rapidly increased by energizing the high flow valve 60 and is monitored at all times by pressure level measuring element 62. As seen in the diagram of FIG. 3, the flow during the Pressurization phase is maintained at the HIGH Flow level, equivalent to a flow rate greater than 1000 Standard Cubic Centimeters per minute. Additionally, as seen in FIG. 4, the pressure within the test part 40 rises steadily toward a predetermined threshold pressure level. Once the pressure reaches the predetermined threshold pressure level, the Pressurization phase ends and the Stabilization phase starts.

During the Stabilization phase, the high flow valve 60 is adjusted, i.e. pulsed on/off, as necessary to maintain the pressure level inside the test part 40 at or slightly above the predetermined threshold pressure level. An alternate means of adjusting the fluidic pressure level at the predetermined threshold level during the Stabilization phase is to adopt a proportional valve instead of the high flow valve 60. The proportional valve automatically sets the flow rate into the test part to achieve and maintain the desired predetermined threshold pressure. The Stabilization phase lasts for a first programmed time duration. Upon completion of the Stabilization phase, the Leak Test phase commences.

During the Leak Test phase, the high flow valve 60 is shut off and flow controller element 58 is activated to maintain the air flow rate into the test part 40 at the programmed value between the Flow Upper Limit (UL) and the Flow Lower Limit (LL), thus achieving a relatively constant flow rate into the test part. At the same time, the pressure inside test part 40 is monitored by the pressure level measuring element 62. Interpretation of the fluidic pressure applied to the test part may consist of two methods, a predetermined pressure threshold method or a pressure trending method.

In the case of the predetermined pressure threshold method, the Leak Test phase lasts a second programmed time duration. During the course of this second programmed time duration, the fluidic pressure within test part 40 will naturally rise above the predetermined pressure threshold level if the test part 40 is free of defects that would allow the air to escape. When the second programmed duration time expires, the control system 64 compares the fluidic pressure value within test part 40 as measured by the pressure level measuring element 62 with the programmed predetermined pressure threshold level. If the fluidic pressure is greater than the predetermined pressure threshold level, the test part 40 is considered to be leak free. If the fluidic pressure drops below the predetermined pressure threshold level, the test part 40 is considered to be damaged.

In the case of the pressure trending method, the interpretation of the fluidic pressure value to determine whether a test part is leak free is based on the detection of a positive or negative trend of the fluidic pressure applied to the test part in conjunction of whether the fluidic pressure is greater or lower than the predetermined threshold pressure. If the fluidic pressure is detected to have a positive trend and its value is greater than the predetermined threshold pressure, the test part is considered to be leak free. If the fluidic pressure is detected to have a negative trend and its value is lower than said predetermined threshold pressure, the test part is considered to be defective. The definition of a positive (or negative) trend is the detection of a consecutive, programmable number of positive (or negative) changes of the fluidic pressure value. Although more difficult to implement, this method has the clear advantage over the predetermined pressure threshold method that the leak test outcome can be determined without having to wait for the expiration of the second programmable time duration. In other words, the Leak Test phase concludes as soon as the appropriate fluidic pressure level, either above or below the predetermined threshold pressure, and the corresponding trend, positive or negative, are detected.

With either fluidic pressure interpretation method, the test outcome is communicated to the operator via the user interface 66.

Figure 5:
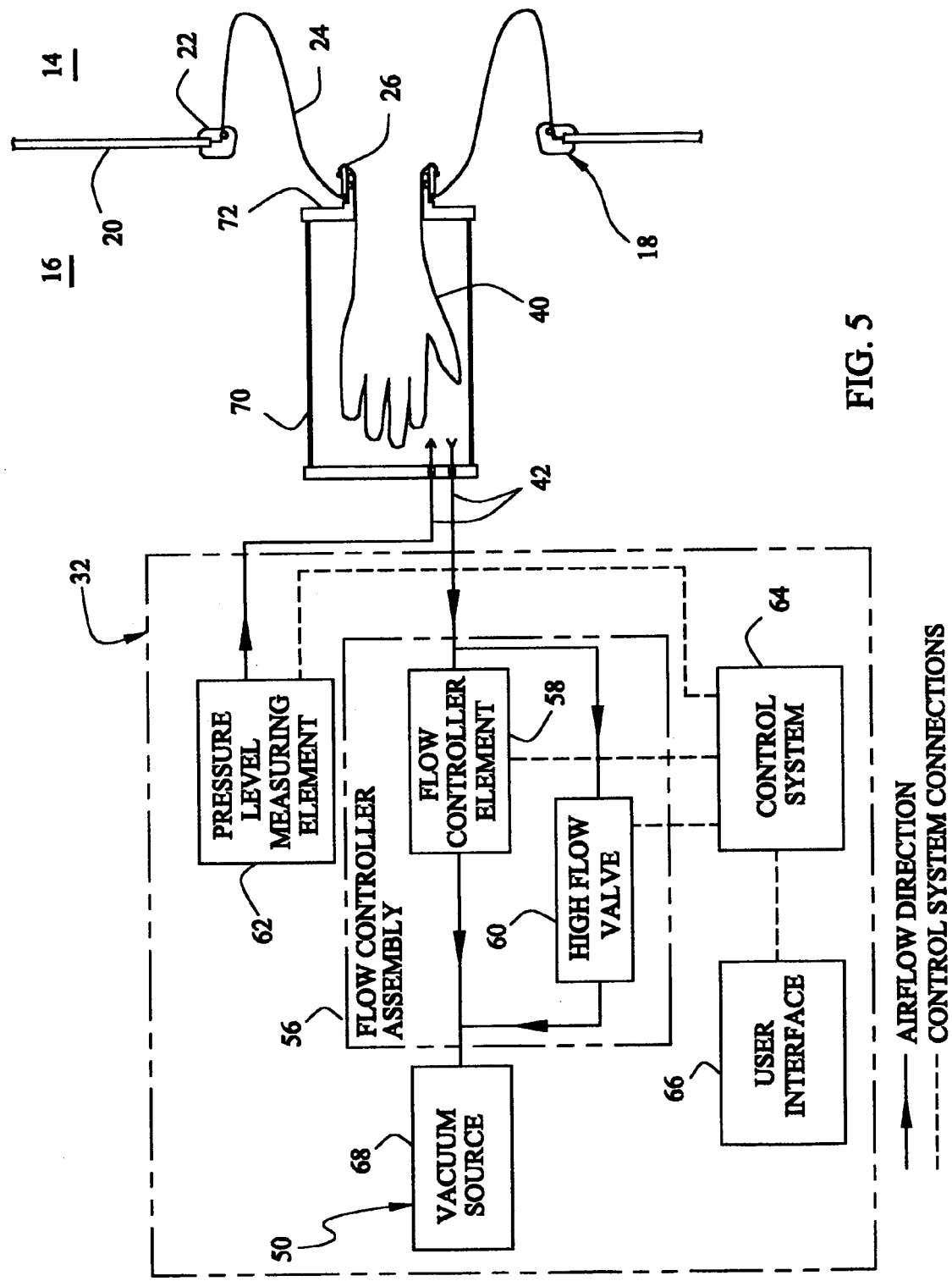
FIG. 5 is a functional block diagram of the system in its negative pressure usage configuration.

Referring now to FIG. 5. the functional components of the leak testing control assembly 32 are shown when operating in the negative pressure leak test mode. As in the previous example, the leak testing control assembly 32 includes a working fluid generator, designated generally as 50, for applying a working fluid having a fluidic pressure to test part 40. The working fluid generator 50 is a vacuum source 68 in this negative pressure environment. In this negative pressure example, the vacuum source 68 applies a negative pressure to the test part 40 by evacuating the working fluid at a selected relatively constant flow rate from the interior volume of a chamber 70 surrounding the test part 40. The vacuum source 68 may be. for example, a diaphragm type vacuum pump connected to the system via an adjustable vacuum pressure regulator set at. for example, about 2 to 3 inches of mercury negative pressure. Obviously other suitable fluid sources may be used such as a venturi type vacuum source or a facility vacuum source provided by the user of the leak tester.

As in the positive pressure example previously discussed, a flow controller assembly 56 is coupled to the working fluid generator 50. The flow controller assembly 56 includes a flow controller element 58 for controlling the flow rate of the working fluid. It also preferably includes a high flow valve 60 for applying an initial fluidic negative pressure to the test part 40 at a higher flow rate than the selected relatively constant flow rate prior to the application of the fluidic pressure to the test part at the selected flow rate. The flow controller element 58 and other as aspects of the leak testing control assembly 32 may be such as that described above.

A pressure level measuring element 62 is coupled to the interior volume of chamber 70 via pneumatic connections 42 and measures the fluidic pressure of the interior volume of chamber 70 that in turn correspond to the negative fluidic pressure applied to the exterior surfaces of test part 40. As in the previous example, the pressure level measuring element 62 may be, for example, a pressure transducer capable of measuring pressure values as high as 4000 pascals and capable of electronically communicating the pressure value to other electronic devices.

As in a previous example, a control system 64 facilitates application of fluidic negative pressure at a selected relatively constant flow rate to chamber 70, permits the fluidic pressure to stabilize for a first programmable time duration and interprets the value of the fluidic pressure to determine the outcome of the leak test. As explained above, in the case of the predetermined pressure threshold method, it compares the fluidic pressure with the predetermined threshold pressure at the end of a second programmed time duration. In the case of a pressure trending method, it detects a positive or negative trend of the fluidic pressure to make a determination of the leak test outcome.

Also as in the previous example, a user interface 66 is coupled to control system 64 for providing user interaction with the testing control assembly 32. Control system 64 and user interface 66 will be discussed in greater detail below.

The flow controller assembly 56 and pressure level measuring element 62 are connected to chamber 70 via pneumatic connection 42 and test part interface 72. As in the positive pressure example given, test part 40 is part of the gloveport system 18 that is attached to the barrier isolator wall 20 via cuff 26, sleeve 24 and the gloveport 22.

Figure 6:
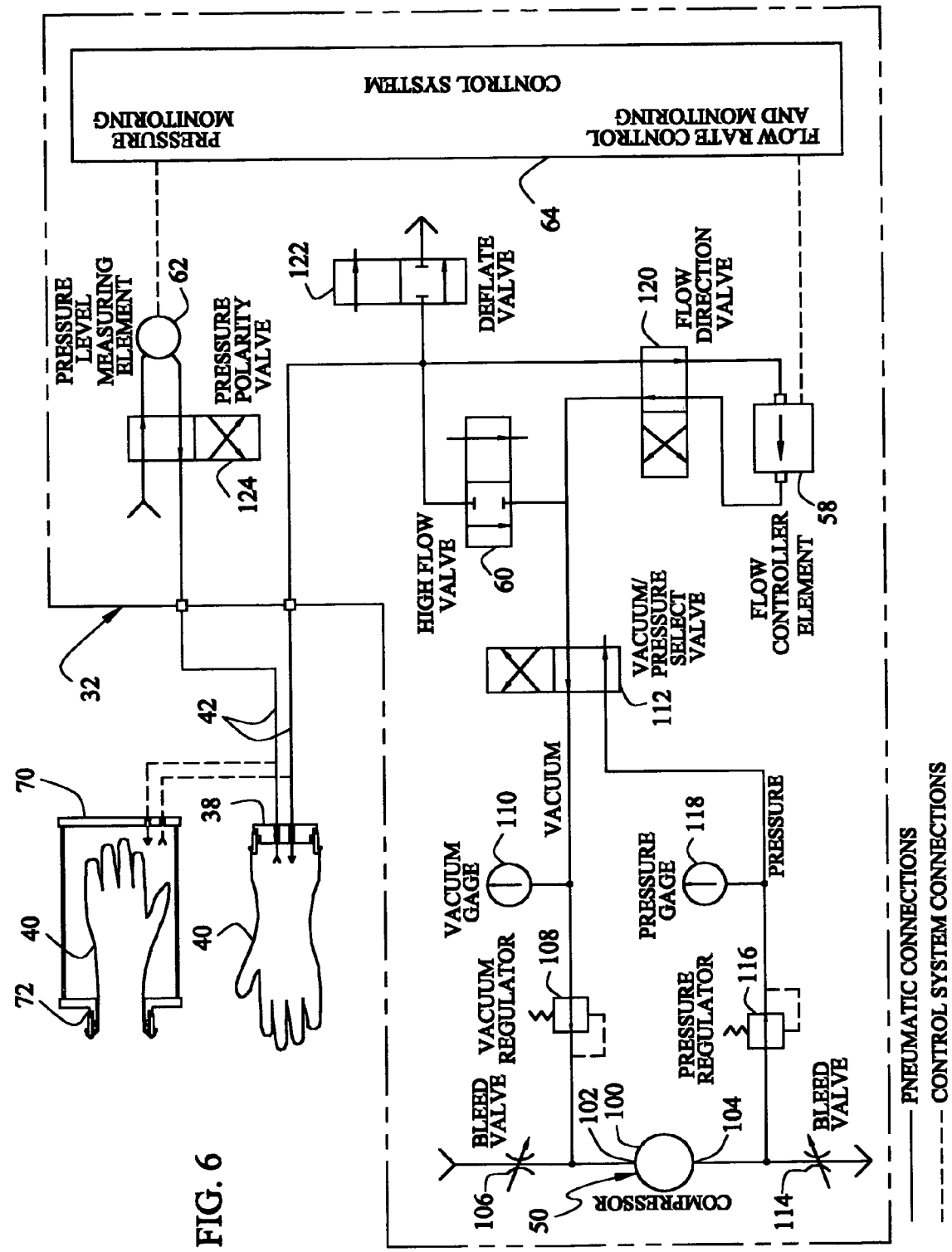
FIG. 6 is a functional block diagram of the system in its positive/negative pressure selectable configuration.

A third embodiment of the current invention is illustrated in FIG. 6. This embodiment includes the capability of operating the system in either a positive or negative pressure leak test mode. As described in the previous embodiments, leak testing control assembly 32 contains a working fluid generator, designated generally as 50, that, in this embodiment, may be such as a dual port compressor 100 that provides a supply of both positive and negative pressure working fluid to the test part 40. Dual port compressor 100 has a negative pressure port 102 and a positive pressure port 104. Connected to the negative pressure port 102 of the dual port compressor 100 is bleed valve 106 and vacuum regulator 108. The regulated side of vacuum regulator 108 is connected to a vacuum gage 110 and vacuum/pressure select valve 112. Connected to the positive pressure port 104 of dual port compressor 100 is bleed valve 114 and pressure regulator 116. The regulated side of pressure regulator 116 is connected to a pressure gage 118 and vacuum/pressure select valve 112. Vacuum/pressure select valve 112 performs the function of supplying either positive or negative pressure to the rest of the instrumentation within control console 32. The output port of vacuum/pressure select valve 112 is connected to high flow valve 60 and flow direction valve 120. The output port of high flow valve 60 is directly connected to pneumatic connection 42 to either test part interface 38 in the case of positive pressure mode of operation or to test part interface 72 in the negative pressure mode of operation as required by the application. Flow direction valve 120 maintains the direction of the air flowing through flow controller element 58 unidirectional, independently of whether the system is operating in positive pressure or negative pressure mode. The output side of flow direction valve 120 is connected to pneumatic connection 42 and to the deflate valve 122 and to high flow valve 60. Deflate valve 122 bleeds the pressure applied to test part 40 back to atmospheric pressure upon completion of the leak test cycle. Similarly to flow controller element 58, pressure level measuring element 62 is also affected by working fluid pressure polarity, positive or negative. Pressure polarity valve 124 permits using pressure level measuring element 62 in either positive or negative pressure mode by referencing the measured pressure to atmospheric pressure, as required by the positive or the negative pressure mode of operation. In summary then, vacuum/pressure select valve 112, flow direction valve 120 and pressure polarity valve 124 permit the selection of negative pressure or positive pressure mode of operation without the need for changing any of the instruments of the system. The selection can be made with the actuation of a selector switch. To conduct a positive pressure leak test, the operator selects a positive pressure setting in the control system 64 and connects test part interface 38 to the leak testing control assembly 32. Alternatively, to perform a leak test in the negative pressure mode, the operator selects a negative pressure setting in the control system 64 and connects chamber 70 containing test part interface 72 to leak testing control assembly 32.

Figure 7:
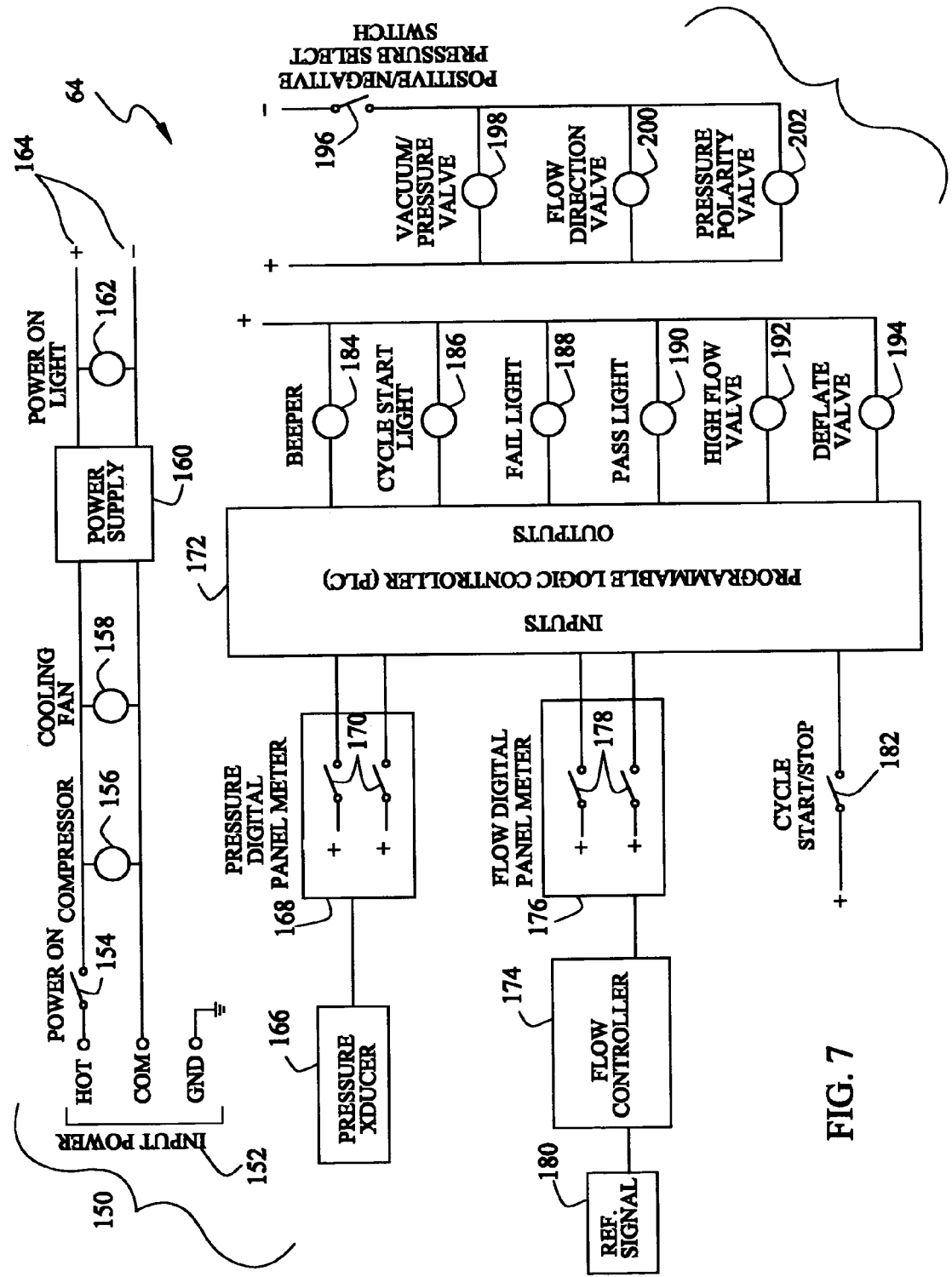
FIG. 7 is the electrical diagram of the system showing both power and control components.

Referring now to FIG. 7, a detailed description of control system 64 of the third embodiment of the present invention is made. Control system 64 consists of a number of control system components generally designated as 150. Such components include control, input and output devices as described in detail below.

Electrical input power 152 provides the electrical supply to the system. Power is applied to the system by actuating the power on switch 154. This action applies power to compressor 156, cooling fan 158 and power supply 160. Power supply 160 converts input power 152 into DC power 164 that is conducive to the operation of the devices of the system. Power on light 162 is energized when DC power 164 is active. Pressure transducer 166 provides a pressure level signal to pressure digital panel meter 168 that displays the pressure value detected by transducer 166. Located inside pressure digital panel meter 168 are pressure level switches 170. Pressure level switches 170 are programmed to energize at selected pressure levels as required by the leak test process and are connected to Programmable Logic Controller (PLC) 172. Flow controller 174 is connected to flow digital panel meter 176. Flow digital meter 176 displays the current flow rate value detected by flow controller 174 and contains flow level switches 178. Flow level switches 178 are programmed to energize at selected flow rate levels as required by the leak test process and are connected to PLC 172. The desired flow rate value is achieved by adjusting reference signal 180 that is connected to flow controller 174.

The operator initiates a leak test cycle by depressing cycle start/stop switch 182 connected to PLC 172. PLC 172 controls the function of beeper 184, cycle start light 186, fail light 188, pass light 190, high flow valve 192 and deflate valve 194 as required by the leak test cycle. In addition, positive/negative pressure select switch 196 permits the operator to select a positive or negative pressure mode of operation by energizing vacuum/pressure select valve 198, flow direction valve 200 and pressure polarity valve 202.

PLC 172 is a commercially available machine control device featuring eight digital inputs and six digital outputs and manufactured by General Electric; there are numerous manufacturers of similar devices having comparable features and capable of performing the functions described. PLC 172 is programmed in the machine programming language commonly known as ladder logic. The program is such that the functional requirements described above are incorporated, including but not limited to, reacting to the logic state of each input turning on and off each output and performing the timing and alarm functions of the leak test cycle.

Control system components 150 include the devices of the system's user interface. Such devices include: power on light 162 that comes on whenever power on switch 154 is energized, pressure digital panel meter 168 that displays the current pressure value, flow digital panel meter 176 that displays the current flow rate value, cycle start/stop switch 182 that the operator uses to control the leak test cycle, cycle start light 186 that informs the operator of the status of the leak test cycle, fail light 188 that informs the operator that the item under test has failed the leak test and pass light 190 that informs the operator that the item under test has passed the leak test.

Figure 8:
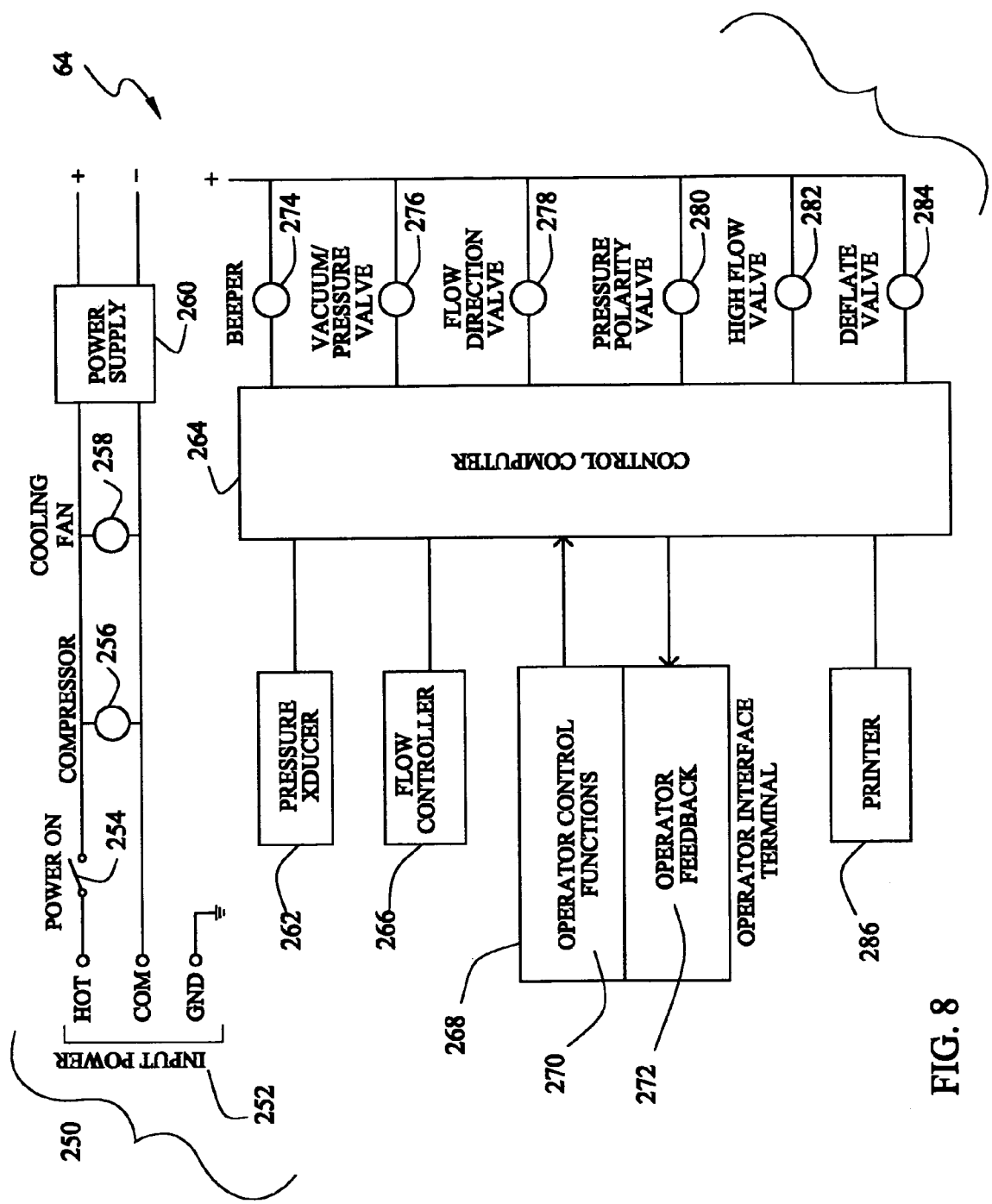
FIG. 8 shows the control diagram of the system showing expanded operator interface and printing capability.

FIG. 8 illustrates an alternate control system configuration that adopts a computer system to perform control and operator interface functions. This alternate control system consists of a number of control system components generally designated as 250.

As in the previous control system example, input power 252 provides electrical supply to the system. Power is applied to the system by actuating power on switch 254. This action applies power to compressor 256, cooling fan 258 and power supply 260. Pressure transducer 262 provides pressure level signal to the control computer 264. Flow controller 266 provides air flow level signal to the control computer 264. Connected to the control computer 264 is operator interface panel 268 that includes leak test cycle control functions 270 and operator feedback functions 272.

Leak test cycle control functions 270 include programming cycle parameters, such as pressure value, flow value, cycle time, pass/fail pressure value, and cycle control functions, such as cycle start/stop, cycle abort, cycle repeat. Operator feedback functions 272 include leak test cycle outcome feedback to the operator, such as pass/fail indication. end of cycle pressure and flow values, printing control.

Control computer 264 may be a standard PC running an XP level Microsoft operating system with the appropriate analog hardware interface to connect to pressure transducer 262 and flow controller 266 and the appropriate digital hardware interface to control beeper 274, vacuum/pressure valve 276, flow direction valve 278, pressure polarity valve 280, high flow valve 282 and deflate valve 284. Control computer 264 also has a standard interface to a printer 286 that allows printing a written report of the leak test results.

The control computer function and the operator display and input function may be combined in a single piece of hardware such as that manufactured by Advantech. This hardware consists of a touch panel computer that permits the operator to conduct the input functions by simply touching the front surface of the display. The same device is a full computer capable of performing all the functions described above. Typical programming language for this application is Microsoft Visual Basic although other programming languages may be adopted for this purpose.

Figure 9B:
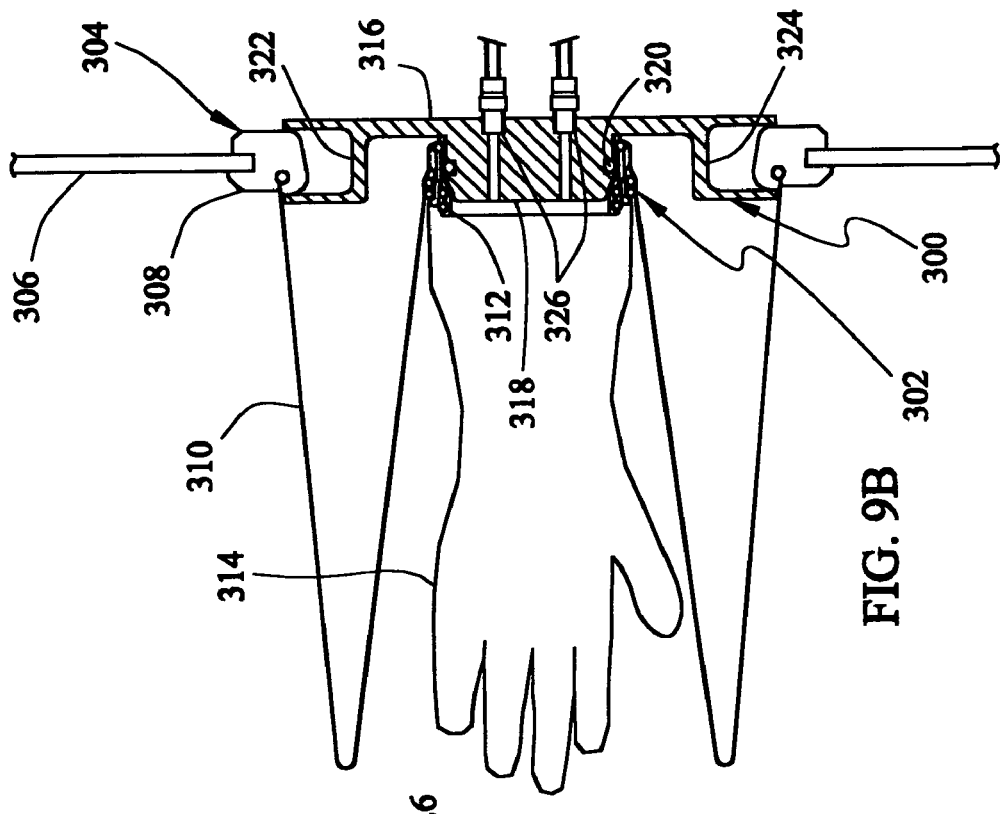
FIG. 9 is a positive pressure cuff interface that shows a possible interface to an isolator glove featuring a cuff type of glove mounting.
Figure 9A:
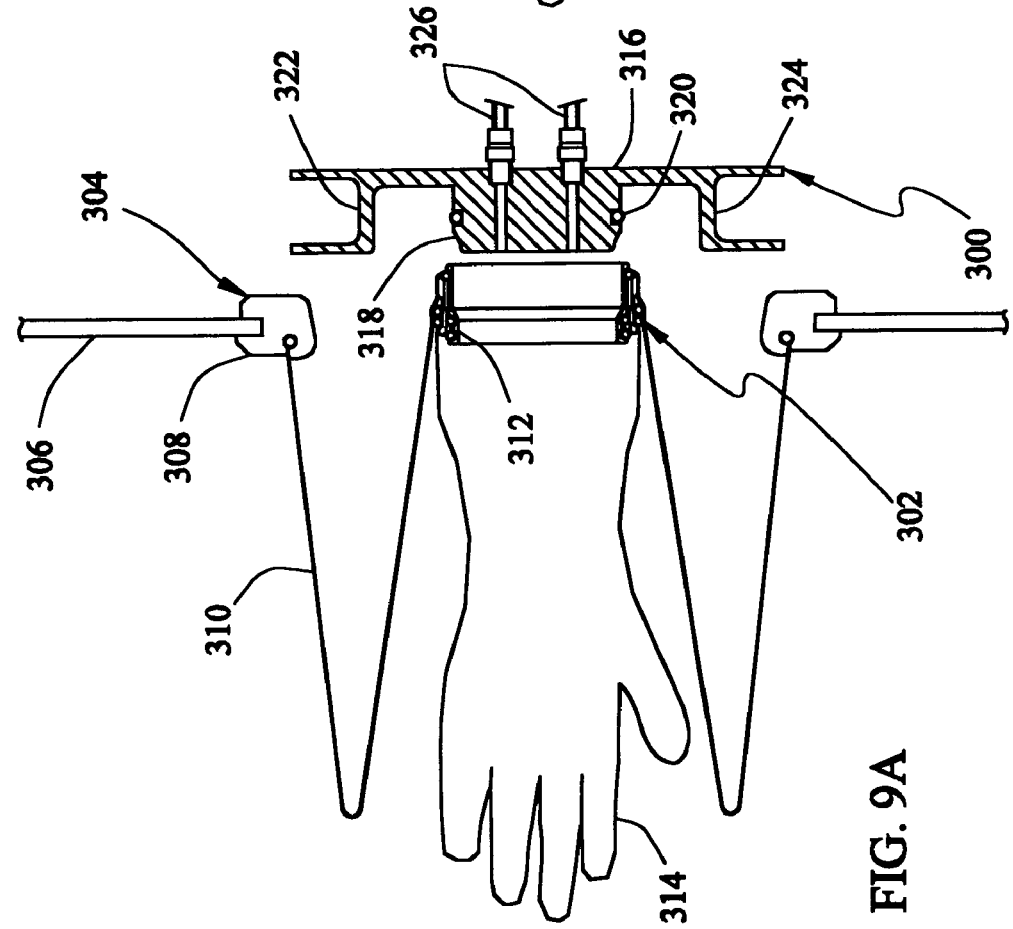

Referring now to FIGS. 9A and 9B, one possible embodiment of a positive pressure test part interface is demonstrated. In both figures, the test part interface is designated generally as test part interface 300 and the test part is designated generally as 302. In FIG. 9A, test part 302 is shown ready for installation onto test part interface 300. In FIG. 9B, test part 302 is shown installed onto test part interface 300 and ready for a leak test cycle.

Test part 302, in this case, is that found in a gloveport system 304 installed on isolator wall 306 comprising a gloveport 308, sleeve 310, cuff 312 and glove 314. Test part interface 300 consists of a gloveport interface 316 that features a male protrusion 318 with a sealing "O" ring 320. Gloveport interface 316 attaches to gloveport 308 by means of upper interlocking channel 322 and lower interlocking channel 324. Gloveport interface 316 also has pneumatic connections 326 that connect the gloveport interface 316 to the leak testing control assembly.

During use of the positive pressure test part interface, the operator places cuff 312 onto protrusion 318 of gloveport interface 316 until "O" ring 320 engages the internal surface of cuff 312 thus creating a leak tight connection. The operator then places gloveport interface 316 onto gloveport 308 by engaging upper interlocking channel 322 and then lower interlocking channel 324 onto gloveport 308. The operator then performs a leak test cycle, as described in detail above.

Referring now to FIGS. 10A and 10B, one possible embodiment of a negative pressure test part interface is demonstrated. In both figures, the test part interface is generally designated as test part interface 350 and the test part is generally designated as 352. In FIG. 10A, test part 352 is shown ready for installation onto test part interface 350. In FIG. 9B, test part 352 is shown installed onto test part interface 350 and ready for a leak test cycle.

Similarly to the previous example given, test part 352 consists of a sleeve 354, a cuff 356 and a glove 358. Test part interface 350 consists of a sealing chamber 360 consisting of a chamber front plate 362, tubular body 364 and chamber rear plate 366. Front plate seal 368 creates a leak tight connection between chamber front plate 362 and tubular body 364. Similarly, rear plate seal 370 creates a leak tight connection between tubular body 364 and chamber rear plate 366. Chamber front plate 362 includes a male protrusion 372 with a sealing "O" ring 374 and a center opening 376. Chamber rear plate 366 includes pneumatic connections 378 that connect the test part interface 350 to the leak tester.

During use of the negative pressure test part interface, the operator inserts glove 358 into the opening 376 of male protrusion 372 and places cuff 356 over male protrusion 372 until "O" ring 374 engages the internal surface of cuff 356 thus creating a leak tight connection. The operator then performs a leak test cycle, as described in detail above.

Although the invention here described is directed mostly for use in the pharmaceutical industry, it is understood that it is equally applicable to the medical devices and food industry, and any other industry requiring the detection of minute breaches in the component under test.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A leak testing control assembly for a leak testing system of a type that cooperates with a test part interface that is coupled with a test part, said leak testing control assembly comprising:
    a) a working fluid generator for applying a working fluid having a fluidic pressure to a test part;
    b) a flow controller assembly coupled to said working fluid generator, said flow controller assembly including a flow controller element for controlling the flow rate of said working fluid;
    c) a pressure level measuring element positioned relative to said test part for measuring said fluidic pressure;
    d) a control system coupled to said flow controller assembly and said pressure level measuring element; and,
    e) a user interface coupled to said control system for providing user interaction with the leak testing control assembly, wherein during operation said control system 1) facilitates application of said fluidic pressure at a selected relatively constant flow rate; and, 2) Interprets the value of said fluidic pressure, after said application of said fluidic pressure at said selected relatively constant flow rate, to determine whether said test part is free of leaks.

2. The leak testing control assembly of claim 1, wherein:
    said working fluid generator comprises a compressed fluid source for pressurizing said test part by introducing said working fluid at said selected relatively constant flow rate into an interior volume of said test part.

3. The leak testing control assembly of claim 1, wherein:
    said working fluid generator comprises a vacuum source for pressurizing a sealing chamber located about said test part by extracting working fluid at said selected relatively constant flow rate out of an interior volume of said sealing chamber.

4. The leak testing control assembly of claim 1, wherein said flow controller assembly further comprises a high flow valve for applying an initial fluidic pressure to said test part at a higher flow rate than said selected relatively constant flow rate prior to said application of a fluidic pressure to the test part at said selected flow rate.

5. The leak testing control assembly of claim 1, wherein said flow controller assembly further comprises:
    a high flow valve for applying an initial fluidic pressure to said test part at a higher flow rate than said selected relatively constant flow rate prior to said application of a fluidic pressure to the test part at said selected flow rate; and,
wherein said control system adjusts said relatively higher flow rate for a first programmed time duration to maintain said fluidic pressure to said test part at or above a predetermined threshold pressure also prior to said step of applying a fluidic pressure to the test part at said selected relatively constant flow rate.

6. The leak testing control assembly of claim 1, wherein said flow controller assembly further comprises:
    a high flow valve for applying an initial fluidic pressure to said test part at a higher flow rate than said selected relatively constant flow rate prior to said application of a fluidic pressure to the test part at said selected flow rate; and,
wherein said control system adjusts said relatively higher flow rate for a first programmed time duration to maintain said fluidic pressure to said test part at or above a predetermined threshold pressure also prior to said step of applying a fluidic pressure to the test part at said selected relatively constant flow rate; and,
wherein said control system applies said selected relatively constant flow rate for a second programmed time duration before comparing said fluidic pressure with said predetermined threshold pressure wherein said fluidic pressure being greater than said predetermined threshold pressure is indicative of a leak free test part and wherein said fluidic pressure being lower than said threshold pressure is indicative of a leak in said test part.

7. The leak testing control assembly of claim 1, wherein said flow controller assembly further comprises:
    a high flow valve for applying an initial fluidic pressure to said test part at a higher flow rate than said selected relatively constant flow rate prior to said application of a fluidic pressure to the test part at said selected flow rate; and,
wherein said control system adjusts said relatively higher flow rate for a first programmed time duration to maintain said fluidic pressure to said test part at or above a predetermined threshold pressure also prior to said step of applying a fluidic pressure to the test part at said selected relatively constant flow rate; and, wherein said control system applies said selected relatively constant flow rate and detects a positive or negative trend of said fluidic pressure wherein a positive pressure trend with said fluidic pressure being greater than said predetermined threshold pressure is indicative of a leak free test part and a negative pressure trend with said fluidic pressure being lower than said predetermined threshold pressure is indicative of a leak in said test part.

8. The leak testing control assembly of claim 1, wherein said test part is a glove.

9. A leak testing system, comprising:
 a) a leak testing control assembly, comprising:
  i. a working fluid generator for applying a working fluid having a fluidic pressure to a test part;
  ii. a flow controller assembly coupled to said working fluid generator, said flow controller assembly Including a flow controller element for controlling the flow rate of said working fluid;
  iii. a pressure level measuring element positioned relative to said test part for measuring said fluidic pressure;
  iv. a control system coupled to said flow controller assembly and said pressure level measuring element; and,
  v. a user interface coupled to said control system for providing user interaction with the leak testing control assembly; and,
 b) a test part interface coupled to said leak testing control assembly for providing fluid communication between said leak testing control assembly and said test part, wherein during operation said control system 1) facilitates application of said fluidic pressure at a selected relatively constant flow rate; and, 2) interprets the value of said fluidic pressure, after said application of said fluidic pressure at said selected relatively constant flow rate, to determine whether said test part is free of leaks.

10. A method for testing a test part for leaks, comprising the steps of:
 a) applying a fluidic pressure to a test part utilizing a selected relatively constant flow rate of a working fluid; and,
 b) interpreting the value of said fluidic pressure, after said application of said fluidic pressure at said selected relatively constant flow rate, to determine whether said test pad is free of leaks.

11. The method of claim 10 wherein:
 said step of applying a fluidic pressure to a test part comprises pressurizing said test part by introducing working fluid at said selected relatively constant flow rate into an interior volume of said test part.

12. The method of claim 10 wherein:
 said step of applying a fluidic pressure to a test part comprises pressurizing a sealing chamber located about said test part by extracting working fluid at said selected relatively constant flow rate out of an interior volume of said sealing chamber.

13. The method of claim 10 further comprising the step of:
 applying an initial fluidic pressure to said test part at a higher flow rate than said selected relatively constant flow rate prior to said step of applying a fluidic pressure to the test part at said selected relatively constant flow rate.

14. The method of claim 10 further comprising the steps of:
 a) applying an initial fluidic pressure to said test part at a relatively higher flow rate than said selected flow rate prior to said step of applying a fluidic pressure to the test part at said selected relatively constant flow rate; and,
 b) adjusting said relatively higher flow rate for a first programmed time duration to maintain said fluidic pressure to said test part at or above a predetermined threshold pressure also prior to said step of applying a fluidic pressure to the test pad at said selected flow rate.

15. The method of claim 10 further comprising the steps of:
 a) applying an initial fluidic pressure to said test part at a relatively higher flow rate than said selected flow rate prior to said step of applying a fluidic pressure to the test part at said selected relatively constant flow rate; and,
 b) adjusting said relatively higher flow rate for a first programmed time duration to maintain said fluidic pressure to said test part at or above a predetermined threshold pressure also prior to said step of applying a fluidic pressure to the test part at said selected flow rate; and,
 c) applying said selected relatively constant flow rate for a second programmed time duration before comparing said fluidic pressure with said predetermined threshold pressure wherein said fluidic pressure being greater Than said predetermined threshold pressure is indicative of a leak free test part and wherein said fluidic pressure being lower than said threshold pressure is indicative of a leak in said test part.

16. The method of claim 10 further comprising the steps of:
 a) applying an initial fluidic pressure to said test part at a relatively higher flow rate Than said selected flow rate prior to said step of applying a fluidic pressure to the test part at said selected relatively constant flow rate; and,
 b) adjusting said relatively higher flow rate for a first programmed time duration to maintain said fluidic pressure to said test part at or above a predetermined threshold pressure also prior to said step of applying a fluidic pressure to the test part at said selected flow rate; and,
 c) applying said selected relatively constant flow rate until a positive or negative trend of said fluidic pressure is detected wherein a positive pressure trend with said fluidic pressure being greater than said predetermined Threshold pressure is indicative of a leak free test part and a negatIve pressure trend with is said fluidic pressure being lower than said predetermined threshold pressure is indicative of a leak in said test part.

17. The method of claim 10, wherein said step of applying a fluidic pressure to a test part comprises applying a fluidic pressure to a glove.

* * * * *